May 4, 1965
J. J. DAMON  3,181,656
HYDRAULIC PLUNGER TYPE SHOCK ABSORBER HAVING
SEPARATE JOUNCE AND REBOUND PASSAGES
Filed June 30, 1961   2 Sheets-Sheet 1
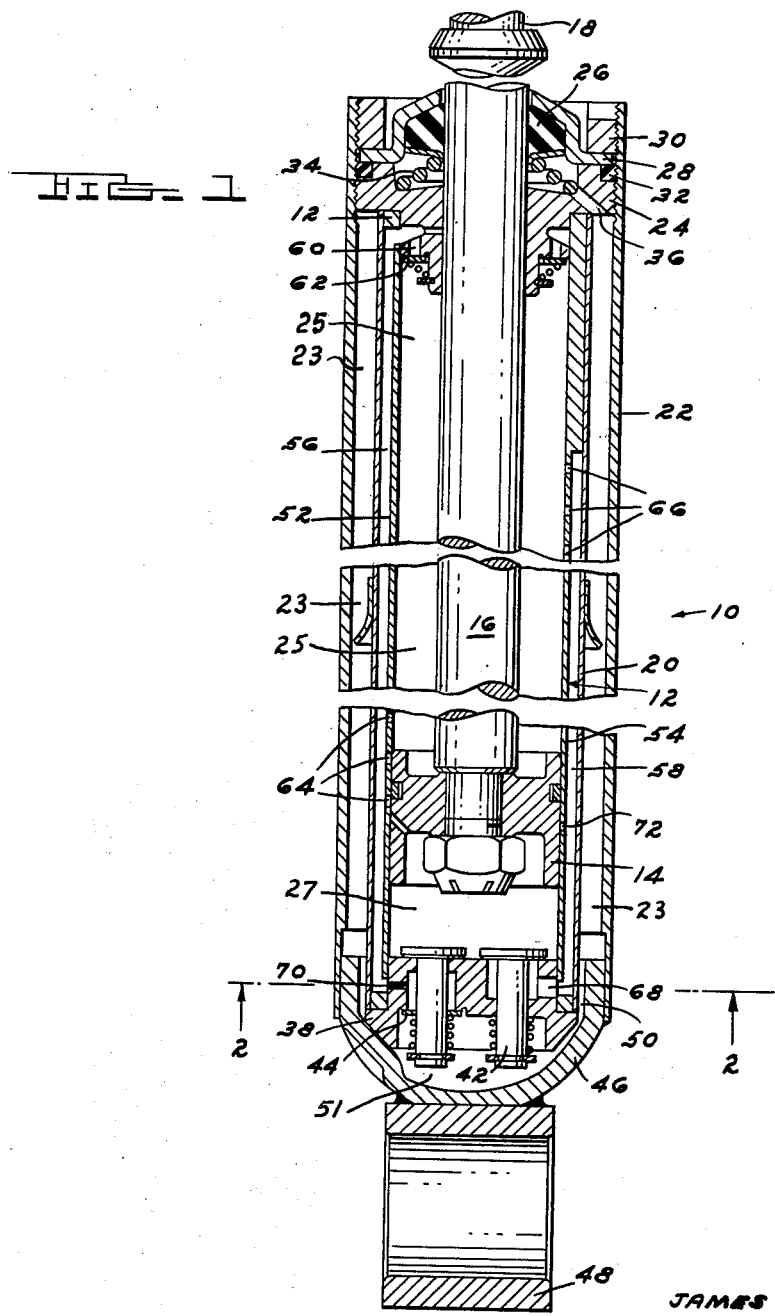
JAMES J. DAMON
INVENTOR
BY *John R. Faulkner*
*Clifford L. Wadley*
ATTORNEYS

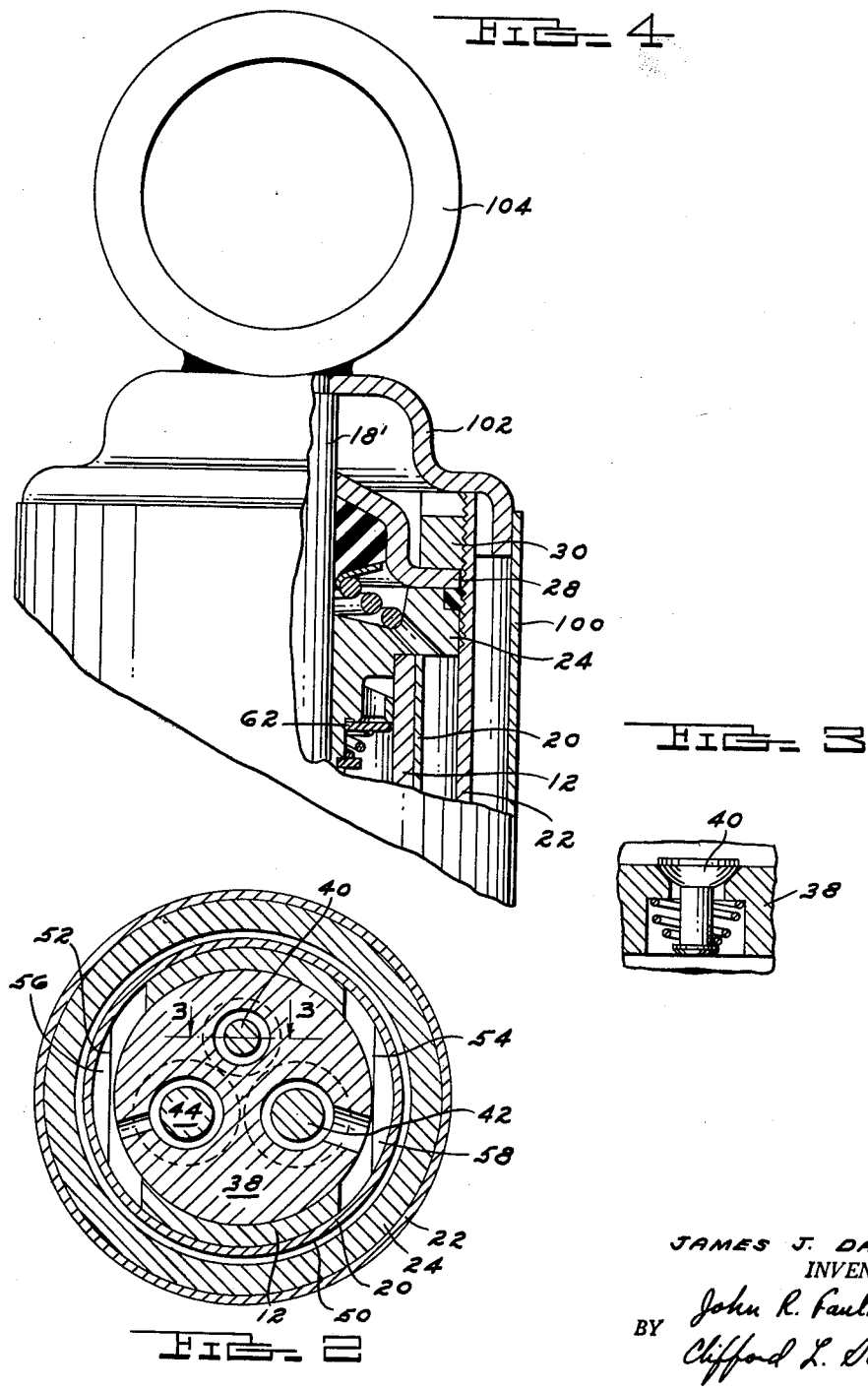

United States Patent Office 3,181,656
Patented May 4, 1965

3,181,656
HYDRAULIC PLUNGER TYPE SHOCK ABSORBER HAVING SEPARATE JOUNCE AND REBOUND PASSAGES
James J. Damon, Dearborn, Mich., assignor to Ford Motor Company, Dearborn, Mich., a corporation of Delaware
Filed June 30, 1961, Ser. No. 120,992
4 Claims. (Cl. 188—88)

The present invention relates to hydraulic shock absorbers and more particularly to shock absorbers of the stroke sensitive variety.

In vehicle suspension systems it is common practice to provide hydraulic damping means to retard body motions occurring during vehicle operation. Inasmuch as the vehicle may encounter a variety of conditions varying from a washboard road to a boulevard situation, it is common practice to compromise the shock absorber design to provide reasonably good damping characteristics over the wide range encountered. As a result, the extremes of operation are less than perfect.

In order to provide adequate control for maximum deflections, stiffness of operation is built into the shock absorber which results in undue harshness during boulevard operating conditions. The counter situation may also occur, that is, insufficient control for extreme deflection in order to provide a soft ride.

In view of the foregoing design conditions, it is an object of the present invention to provide a unique shock absorber design adapted to accommodate a wide variety of operating conditions without compromise. The shock absorber is designed to increase energy absorption at the end of both the rebound and compression strokes without sacrificing operation in the central or low level valving range. These objectives are achieved by providing mutual independence of both compression and rebound damping in order to be able to control harshness, shake and float.

These and further objects of the present invention will be fully comprehended from the following description and the accompanying drawings in which:

FIGURE 1 is an elevational view in section of a shock absorber constructed in accordance with the present invention;

FIGURE 2 is a sectional view taken along section lines 2—2 of FIGURE 1;

FIGURE 3 is a sectional view taken along section lines 3—3 of FIGURE 2; and

FIGURE 4 is an elevational view partly in section of a modification of the shock absorber of FIGURE 1.

Referring now to the drawings wherein the presently preferred embodiment of this invention is disclosed, FIGURE 1 shows a plunger type hydraulic shock absorber 10. The shock absorber 10 contains a pressure tube 12 in which a solid piston 14 is slidably received. The piston 14 contains no valving. It is secured to the end of a piston rod 16 which has an upper end 18 affixed to a sprung component of the vehicle, such as a body member.

The pressure tube 12 is surrounded by a secondary tube 20 and tube 20 in turn is surrounded by a reservoir tube 22. An annular space 23 is provided between the tubes 20 and 22 to hold reservoir fluid for the shock absorber.

The piston 14 divides the interior of the pressure tube 12 into a rebound chamber 25 and a compression chamber 27 situated above and beneath the piston respectively.

The top of the shock absorber assembly 10 is sealed by a head piece 24 that is threadably received in the end of the reservoir tube 22 and is in sliding sealed engagement with the piston rod 16. The head piece 24 seals the open upper end of the pressure tube 12. The closure of the upper end of the unit 10 is completed by a rubber seal 26 surrounding the piston rod 16 and a cap 28 which is secured in position by a threaded ring 30. A rubber piece 32 seals the juncture of the head piece 24 and reservoir tube 22. The elastomeric seal 26 is positioned by a coil spring 34. A diagonal passageway 36 is provided in the head piece 24 to permit the drainage of fluid leaking to the area of the spring 34 back to the reservoir chamber 23.

The foot of the pressure tube 12 is sealed by a base valve body 38 which contains the spring pressed compression chamber replenishing valve 40, as seen in FIGURES 2 and 3. It also contains the low level rebound valve 42 and the spring pressed low level compression valve 44. The operation of the replenishing valve 40, the rebound valve 42 and the compression valve 44 will be described in detail later.

The lower end of the reservoir chamber 23 is sealed by a cup-shaped closure member 46 which has a ring 48 welded thereto. The ring 48 is attached to an unsprung suspension component by a bushing assembly.

It will be noted that the internal diameter of the skirt portion of the closure 46 is greater than the diameter of the tube 20 in order to provide a fluid passageway 50 communicating with area 51 beneath the base valve body 38.

The pressure tube 12 is of thick walled construction as seen in FIGURE 2 and at the top end of FIGURE 1. It has diametrically opposed flat portions 52 and 54 machined therein. The flat portion 52 in conjunction with the secondary tube 20 concentric about the pressure tube 12 provides an axial passageway which constitutes a compression low level valve passage 56. The flat 54 and tube 20 provide an axial passageway which constitutes a rebound low level valve passage 58. The passageways 56 and 58 are mutually independent and are in communication with the low level compression valve 44 and the low level rebound valve 42 respectively.

The head piece 24 has a series of axial ports 60 which are sealed by a spring pressed rebound chamber replenishing valve element 62. The ports 60 and valve element 62 provide controlled communication between the rebound pressure chamber 25 above the piston 14 with the compression low level valve passageway 56.

At the lower end of the wall of the pressure tube 12 a series of axially aligned orifices 64 are provided to permit communication between the compression chamber 27 situated beneath the piston 14 and the low level compression valve passageway 56. Ports 64 comprise the compression high level orifices.

The rebound low level valve passageway 58 communicates with the rebound chamber 25 by means of a series of rebound high level orifices 66 provided in the wall of the pressure tube 12 near its upper end. The lower end of the rebound low level valve passageway 58 is in communication with the compression chamber 27 by means of port 68 and rebound valve 42 provided in the base valve body 38. The spring pressed low level rebound valve 42 provides controlled communication between the passageway 58 and the compression chamber 27 during a rebound stroke.

The base end of the compression low level valve passageway 56 is in communication with port 70 which is sealed by the spring pressed low level compression valve 44. Valve element 44 controls the communication between the compression low level valve passageway 56 and the area 51 beneath the base 38 which in turn connects to the reservoir chamber 23 within the tube 22. During a compression stroke fluid is expelled through the low level compression valve 44 in an amount equal to the volume displaced by the piston rod 16. That fluid flow is in effect dumped from the compression chamber 27 to the reservoir chamber 23.

Valve 40 constitutes a replenishing valve for the compression chamber 27 during the rebound stroke. It provides controlled communication between the compression chamber 27 and the reservoir chamber 23.

Operation during the rebound stroke will now be described. With the piston 14 in the mean or design position and the stroke in the rebound or upward direction, the rebound chamber 25 is pressurized against the control established in the low level rebound valve 42. Fluid is forced from the rebound chamber 25 through the rebound high level orifices 66 into the rebound low level valve passageway 58. The low level valve 42 exhausts into the compression chamber 27 beneath the piston 14, thereby fulfilling part of its replenishment requirements. The remainder of the replenishing volume is drawn from the reservoir chamber 23 through the compression chamber replenishing valve 40 in an amount equal to that displaced by the piston rod.

The desired center range or low level damping force for the rebound stroke is provided by the load of the spring of valve 42 and the amount of flow through orifices 66 connecting the rebound low level passageway 58 and the main pressure tube 12. An additional free flow orifice may be provided by a single small port 72 in the pressure tube 12 at its lower end. Port 72 is a rebound free flow orifice.

As the piston 14 closes off each of the rebound high level orifices 66, the resulting restricted flow to the rebound valve 42 produces a successively higher damping force until the final orifices 66 is closed and a hydraulic lockout or stop is created. When there is no exit remaining for the fluid trapped in the rebound chamber above the piston 14, further piston travel will be prevented.

The return compression stroke will now commence. When the piston 14 is moved in the compression direction or downwardly, the compression chamber 27 beneath the piston 14 is pressurized against the control created by the spring load on the low level compression valve 44. Fluid from the displacement of the piston is forced through the compression high level orifices 64 in the pressure tube 12 into the compression low level passageway 56. Here the flow assumes two directions. An amount of fluid equal to that displaced by the piston rod passes through the low level compression valve 44 into the reservoir chamber 23. The remainder of the fluid flows through the rebound chamber replenishing valve 60, 62 into the rebound chamber 25 above the piston 14.

The required damping force for the compression control is obtained much the same way as in the rebound stroke, that is, the low level resistance is determined principally by the spring load in the compression valve 44. The high level damping occurs through successive closing of the high level orifices 64.

FIGURE 4 discloses a modified shock absorber construction adapted for rear suspension installation. The shock absorber of FIGURE 1 is intended primarily for a front vehicle situation. The principal distinction between the shock absorbers of FIGURE 1 and FIGURE 4 is the use of a tubular dust shield 100 in the latter which surrounds the reservoir tube 22. The internal construction of the shock absorber is identical to that of FIGURE 1. The dust tube protects the shock absorber from contaminants and damage by flying stones. The dust tube 100 is secured to a cap member 102 which is welded to the end of the piston rod 18'. An attaching ring 104 is secured to the end of the piston rod 18' for connection to a body member.

A shock absorber constructed in accordance with the present invention provides a stroke sensitive unit capable of absorbing more energy at the high ends of the stroke while retaining complete versatility in valving for the center range of control. High and low level control valving is entirely independent as well as the jounce and rebound fluid flow. This arrangement permits designing the controls of a shock absorber to meet any desired condition, that is, soft operation for boulevard rides and firm control for extreme suspension deflections plus a hydraulic lockout feature to prevent bottoming of the reciprocating piston.

The foregoing description presents the presently preferred embodiments of this invention. Modifications and alterations will occur to those skilled in the art which will come within the scope and spirit of the following claims.

I claim:

1. A hydraulic shock absorber having a pressure tube, a piston reciprocable within said pressure tube, said piston dividing said tube into rebound and compression chambers, mutually independent rebound and compression passageways communicatively interconnecting said rebound and compression chambers, rebound and compression control orifices located in the wall of said pressure tube, said rebound and compression control orifices being in communication with said rebound and compression passageways respectively, said rebound passageway having control means permitting the controlled expulsion of fluid from said rebound chamber to said compression chamber, said compression passageway providing controlled communication from said compression chamber to said rebound chamber and to a sump.

2. A hydraulic shock absorber having a pressure tube, a piston reciprocable within said pressure tube, said piston dividing said tube into rebound and compression chambers, mutually independent rebound and compression passageways situated exteriorly of said pressure tube and each communicatively interconnecting said rebound and compression chambers, rebound and compression control orifices located in the wall of said pressure tube and in communication with said rebound and compression passageways respectively, said rebound passageway having spring pressed control valve means permitting the controlled expulsion of fluid from said rebound chamber to said compression chamber, said compression passageway providing controlled communication from said compression chamber to said rebound chamber and to a sump.

3. A telescopic plunger type hydraulic shock absorber having a pressure tube, a piston reciprocable within said pressure tube, said piston dividing said tube into rebound and compression chambers, separate mutually independent rebound and compression passageways each interconnecting said chambers and extending axially exteriorly of said pressure tube, said pressure tube having a rebound chamber replenishing valve communicating with said compression passageway, said compression passageway having control orifices in the wall of said pressure tube communicating therewith, a compression valve adapted to permit the flow of fluid from said compression passageway to a reserve fluid chamber during a compression shock absorber stroke, rebound control orifices situated in the upper wall of said pressure tube in communication with said rebound passageway and said rebound passageway having a rebound valve means adapted to permit communication with said compression chamber.

4. A telescopic plunger type hydraulic shock absorber having a pressure tube, a piston reciprocable within said pressure tube, said piston dividing said tube into rebound and compression chambers, parallel situated mutually independent rebound and compression passageways extending exteriorly of said pressure tube and interconnecting said rebound and compression chambers, an outer tube surrounding said pressure tube and containing a reserve fluid chamber, said pressure tube having a bottom closure with a spring pressed one-way compression chamber replenishing valve communicating with said reserve fluid chamber, said pressure tube having a top closure with a one-way rebound chamber replenishing valve communicating with said compression passageway, said compression passageway having control orifices in the wall of said pressure tube communicating with said compression chamber, a spring pressed compression valve adapted to permit fluid flow from said compression passageway to said reserve fluid chamber during a compression stroke of said piston, said rebound passageway having a rebound valve means adapted to permit communication with said compression chamber, rebound control orifices situated in the wall of said pressure tube in communication with said rebound passageway and said rebound chamber.

References Cited by the Examiner

UNITED STATES PATENTS

| | | | |
|---|---|---|---|
| 1,067,444 | 7/13 | Scott. | |
| 1,134,224 | 4/15 | Phillips | 188—88 |
| 2,247,749 | 7/41 | Venel | 188—88 |
| 2,445,407 | 7/48 | Rossman | 188—88 |
| 2,527,034 | 10/50 | Rossman | 188—88 |
| 2,670,812 | 3/54 | Cuskie | 188—88 |
| 3,123,347 | 3/64 | Stormer et al. | 267—64 X |

FOREIGN PATENTS

| | | |
|---|---|---|
| 539,227 | 9/41 | Great Britain. |
| 1,057,048 | 10/53 | Great Britain. |
| 1,065,383 | 1/54 | France. |

EUGENE G. BOTZ, *Primary Examiner.*

A. JOSEPH GOLDBERG, ARTHUR L. LA POINT, *Examiners.*